United States Patent [19]

Kubica et al.

[11] Patent Number: 4,702,294
[45] Date of Patent: Oct. 27, 1987

[54] VEHICLE TIRE WITH FLAT WIRE CARCASS REINFORCEMENT

[76] Inventors: Wladislaw Kubica, Hauergasse 12, A 2410 Hainburg, Austria; Adam Kubica, No. 1 Ofiar, Oswiecimia, Poland

[21] Appl. No.: 837,508

[22] Filed: Mar. 7, 1986

[30] Foreign Application Priority Data

Jun. 10, 1985 [AT] Austria .................................. 1730/85

[51] Int. Cl.⁴ .............................................. B60C 9/08
[52] U.S. Cl. ..................................... 152/556; 152/560
[58] Field of Search ............... 152/451, 284, 560, 558, 152/548, 556; 57/902, 201, 215; 24/122.6, 130

[56] References Cited

U.S. PATENT DOCUMENTS 2,987,095  6/1961  Toulmin, Jr. .................... 152/556 X
3,794,097  2/1974  Kind ................................ 152/556 X
4,606,392  8/1986  Weidenhaupt et al. ......... 152/556 X

FOREIGN PATENT DOCUMENTS 0225477  12/1924  United Kingdom .

Primary Examiner—Donald E. Czaja
Assistant Examiner—Ramon R. Hoch
Attorney, Agent, or Firm—Karl F. Ross; Herbert Dubno

[57] ABSTRACT

A vehicle tire with an elastomeric carcass provided with at least one reinforcement at least partially formed from elements made of flat wire generally spirally wound in a plurality of coils.

7 Claims, 31 Drawing Figures

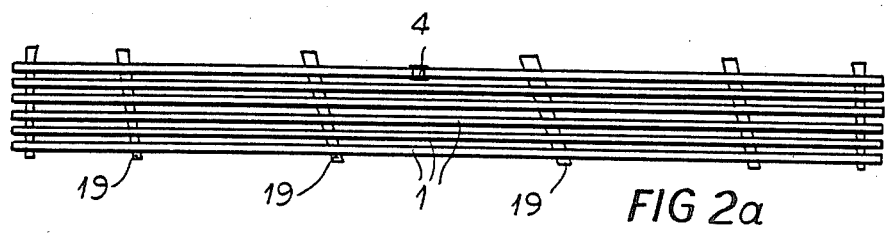
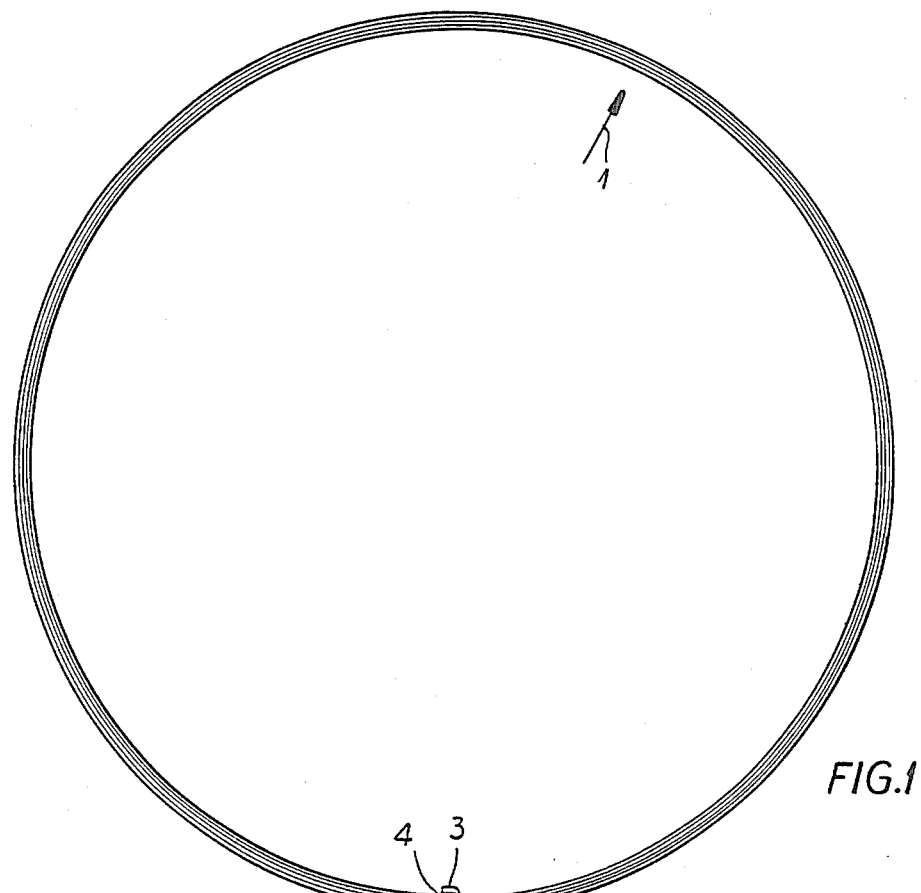
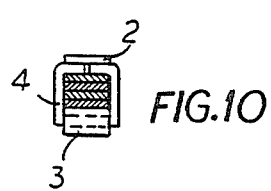
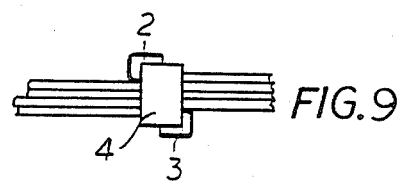
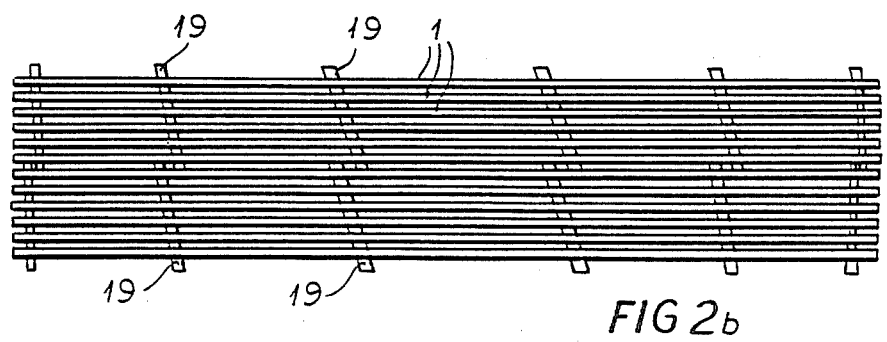

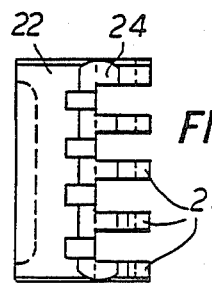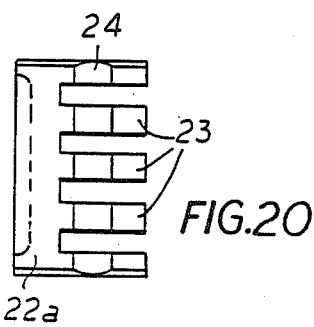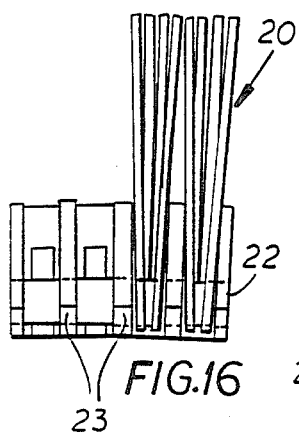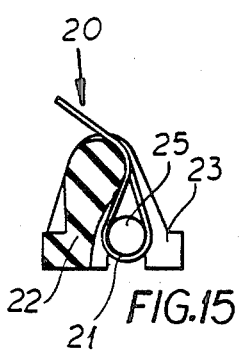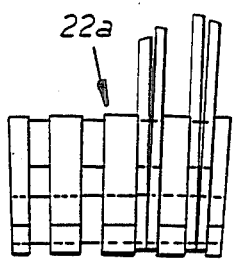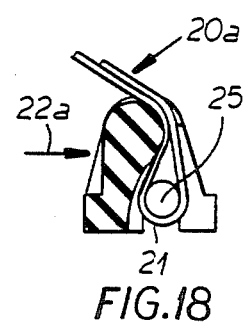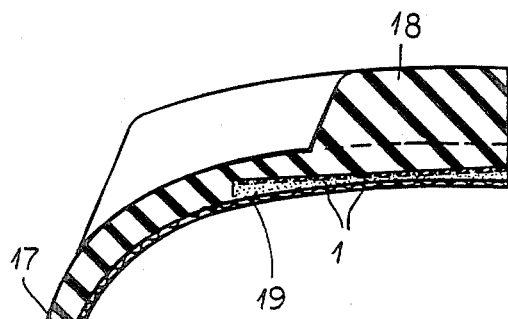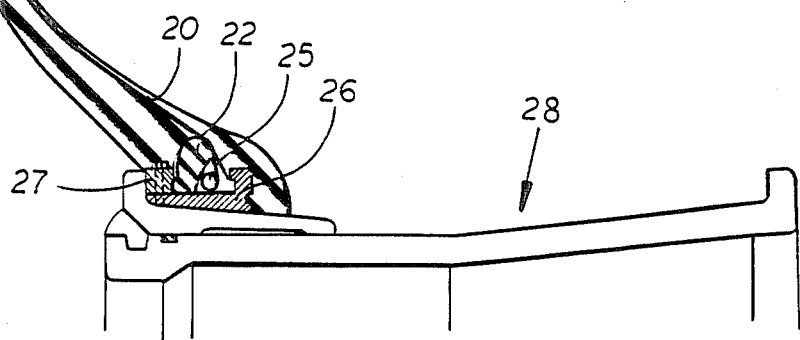

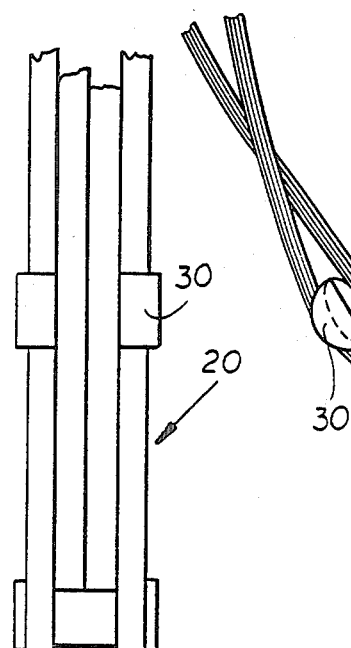
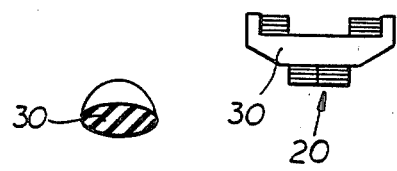
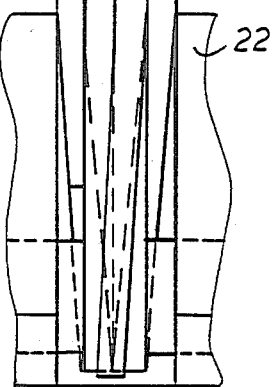
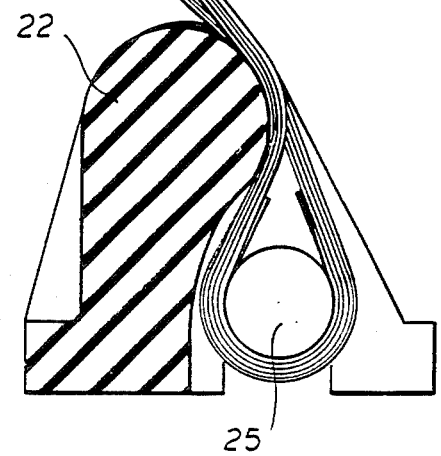
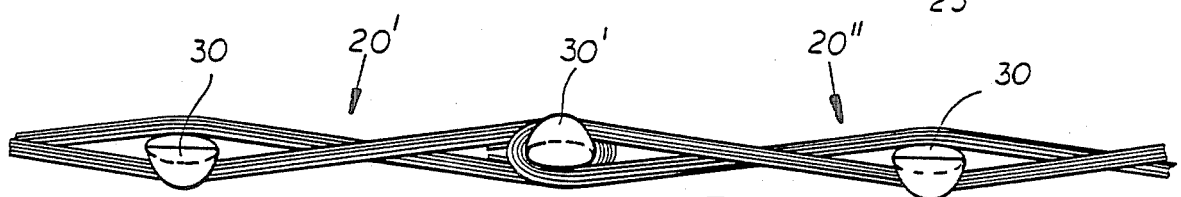
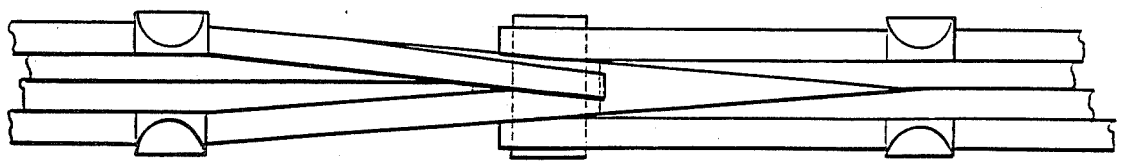

VEHICLE TIRE WITH FLAT WIRE CARCASS REINFORCEMENT

FIELD OF THE INVENTION

Our present invention relates to a vehicle tire with a belt and/or radial reinforcement and, more particularly, to a metal reinforcement for such tires and to a tire incorporating the improved reinforcement.

BACKGROUND OF THE INVENTION

A tire reinforcement usually consists of canvas, textile fiber, steel cord or steel wire.

All of these reinforcements, whether as belts or radial plies, have the disadvantage that their production calls for complex operations which in their turn make necessary the use of complicated machinery.

A further disadvantage is the friction generated during use by rubbing between the canvas (weave) or cord strands or between the steel cords or wires which generates a relatively high degree of heat, limiting the range of use.

OBJECTS OF THE INVENTION

The object of my invention is to provide a vehicle tire which is free from the disadvantages described above and therefore is easier and, consequently, less expensive to produce and, moreover has a wider range of use.

Another object of my invention is to provide a tire reinforcement of improved construction which increases the load-carrying capacity of a tire and its useful life while facilitating fabrication of the tire.

SUMMARY OF THE INVENTION

These objects are achieved by reinforcing the tire at least partially with elements made of flat wire wound in several coils.

The use of elements made of flat preferably steel, wire for the reinforcing of vehicle tires, in accordance with the invention, leads to considerable manufacturing simplification and a corresponding decrease in production costs.

The elements made of flat wire wound in several coils can be entirely prefabricated in a ready-to-be-fitted way. Furthermore, the use of flat wire allows for every conceivable degree of durability, which is especially important for tires destined for heavy-duty vehicles.

To prevent a loosening of the elements during fitting, according to the invention, I press the ends of the flat wire wound in several coils to the element by means of clamps.

The belt of a tire according to the invention can consist of several spirally-wound rings arranged side by side. These rings can be interconnected during prefabrication by means of spacers, so that the entire belt can be prefabricated.

The radial reinforcement preferably also consists of several ring elements placed side by side, each of which can have two spirally wound-rings, made of one piece of wire and wound up side by side, whereby the wire spiral begins on the inner periphery of a first ring, continues onto the outer periphery from the first ring to the second ring, and ends on the inner periphery of the second ring. Such two-ring elements, assembled side by side, can also be interconnected, so that pre-fabrication of the entire ply is also possible in this manner.

The kind of radial reinforcement specified by the invention consists of rings similar to those described for the belt. These are drawn out or flattened to form loops at both ends; between the loops they are fanned out, and bolts or similar devices are arranged in the loops to connect them with the tire beads. The connection is formed by means of anchoring rings on both sides of the tire beads; these rings are equipped with comb-like projections and removable anchoring elements.

Radial reinforcement is especially effective, if, according to another feature of the invention, it consists of two groups of individual elements, offset relative to each other transversely to the cross-section of the tire. In order not to increase the thickness of the tire wall, I prefer to shape the sides of the tire along its entire circumference in a wave-like fashion, corresponding to the individual groups.

BRIEF DESCRIPTION OF THE DRAWING

The above and other objects, features and advantages of the present invention will become more readily apparent from the following description, reference being made to the accompanying drawing in which:

FIG. 1 is an elevational view of one ring adapted to be assembled according to the invention into a belt with other rings or to be stretched out for radial reinforcement;

FIG. 2a is a top view of one half-belt consisting of rings as shown in FIG. 1;

FIG. 2b is a top view of the entire belt;

FIG. 9 is a fragmentary side view of the end of a ring according to FIG. 1 (drawn to an enlarged scale);

FIG. 10 is an end view of the clamp used for the ring of FIG. 1;

FIG. 15 is a cross-section of an anchoring element;

FIG. 16 is an elevational view of the anchoring element;

FIG. 17 is a fragmentary plan view of this element;

FIGS. 18, 19, and 20 are views similar to FIGS. 15, 16, and 17 of an alternative anchoring element;

FIG. 21 is a cross-section similar to FIG. 11 of a slightly modified version;

FIG. 25 is a section and FIG. 26 an elevational view of an alternative of a preshaped radial element;

FIG. 27 and FIG. 28 are respectively a side view and cross-section of a specially made clip; and FIGS. 29 and 30 are side elevation and plan views of a further modification.

SPECIFIC DESCRIPTION

According to FIGS. 2a and 2b, the belt of a tire consists of individual rings wound up side by side, each made of one spirally-wound flat wire. The ends 2 and 3 of the flat wire are turned up and held by a simple clamp 4. In FIG. 9, the part of the ring 1 (FIG. 1) equipped with the clamp 4 is shown on an enlarged scale, and FIG. 10 shows the clamp 4.

Moreover, FIGS. 2a and 2b show spacers whose structure and function will be explained by means of FIGS. 11, 23 and 24.

Figure 4:
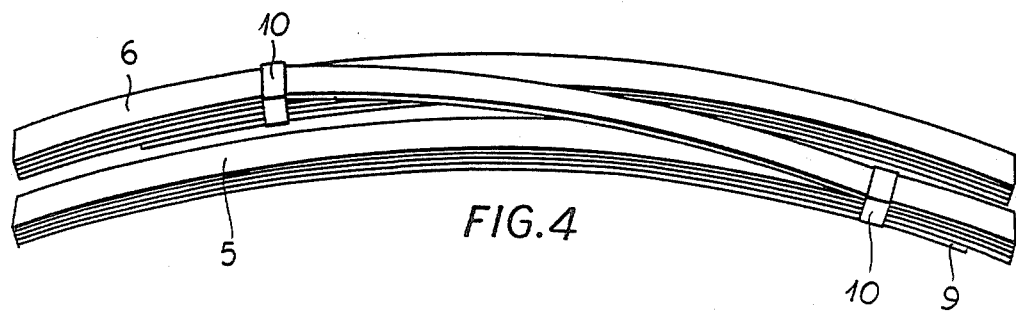
FIG. 4 is a perspective view of the connection of the two rings arranged side by side.
Figure 3:
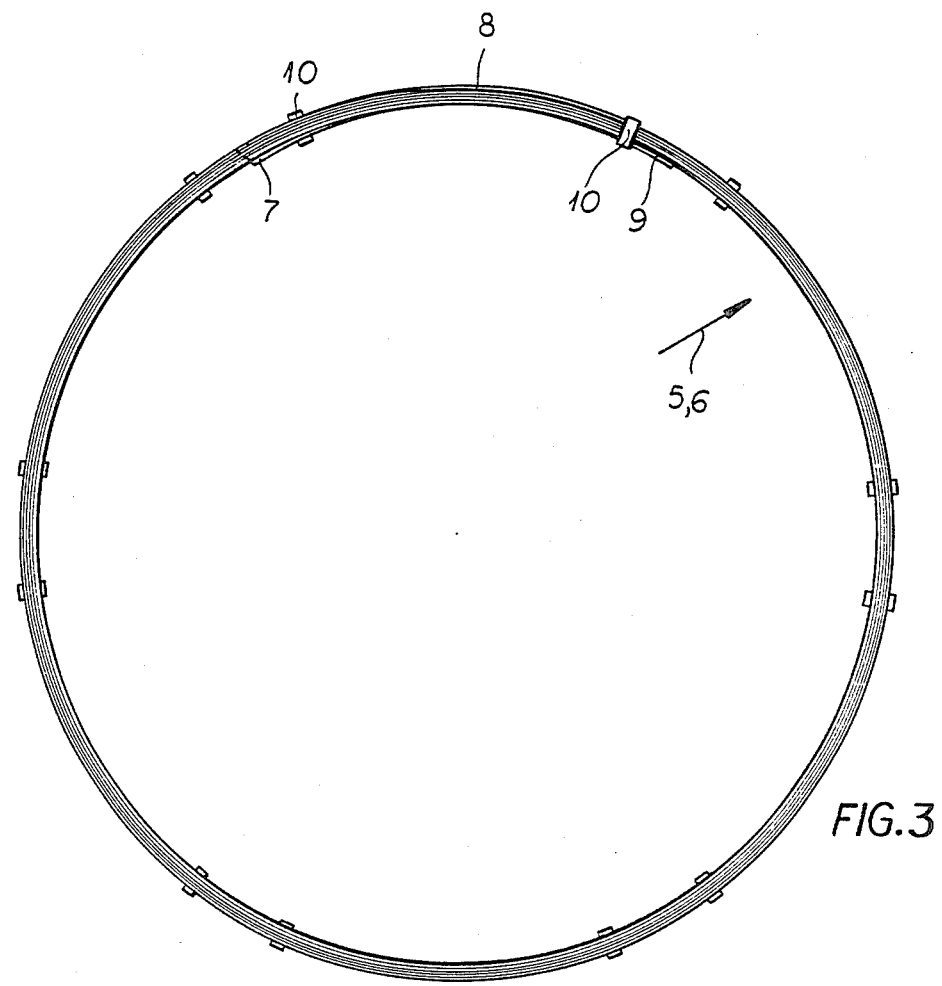
FIG. 3 is an elevation of a belt element consisting of two rings.
Figure 5:
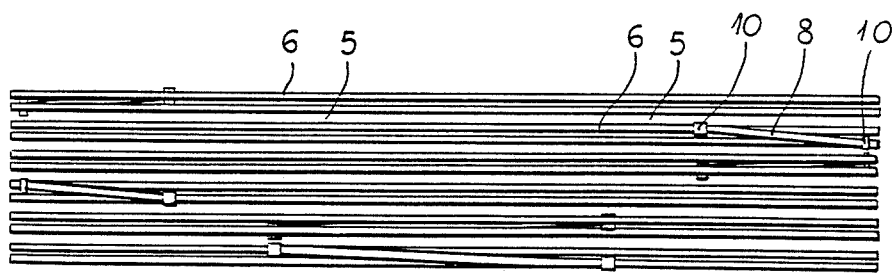
FIG. 5 is a top view of a belt consisting of rings assembled from the elements of FIGS. 3 and 4.

Every element of a belt according to FIGS. 3 to 5 consists of two rings arranged side by side (5 and 6). These rings 5 and 6 are each made of one single, spirally-wound piece of flattened metal, e.g. steel, (FIG. 1) wire; the wire spiral beginning 7 on the inner periphery of the ring, continuing on the outside with segment 8 to ring 5, and ending 9 on the inner periphery of ring 5. There are clamps 10 within segment 8.

Figure 8:
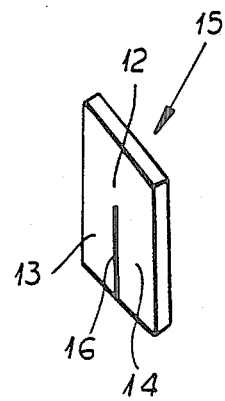
FIG. 8 is a perspective view of the sheet bar necessary for production of the clamp.
Figure 7:
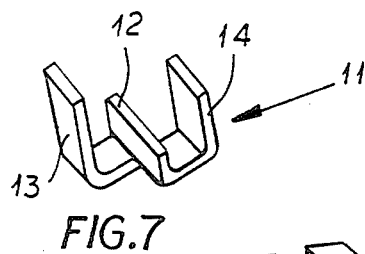
FIG. 7 is a perspective view of the clamp.
Figure 6:
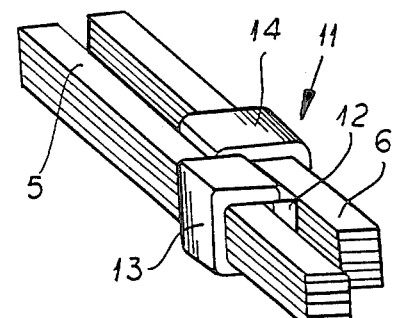
FIG. 6 is a perspective view of two parts of the rings arranged side by side and connected by means of a clamp.

Instead of the clamps 10, clamps according to FIGS. 6 to 8 can be used. These clamps 11 are equipped with a bridge in the middle 12, from which flaps 13, 14 emerge in both directions. These flaps 13 and 14 surround the rings 5 and 6, so that the two rings 5 and 6 are held at distance from each other by means of a clamp.

The production of such a clamp is simple: requiring only a sheet bar 15 with a longitudinal section 16, the uncut part forming the bridge 12, so that the two flaps 13 and 14 can be simply turned outwards.

Figure 23:
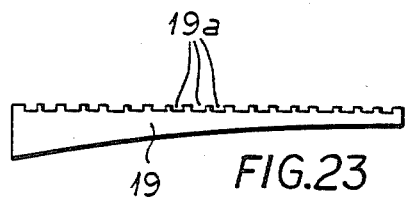
FIGS. 23 and 24 are diagrams of a spacer in two directions perpendicular to one another.
Figure 24:
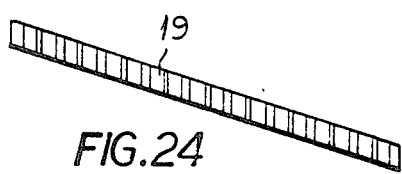
Figure 22:
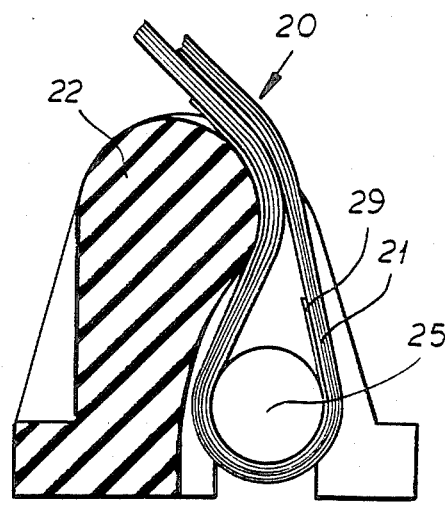
FIG. 22 is a cross-section of an alternative to FIG. 18 (drawn to an enlarged scale)
Figure 13:
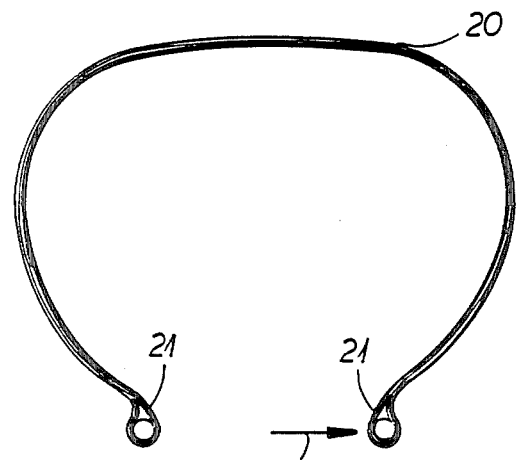
FIG. 13 is a diagram of a preshaped radial reinforcing element.

In order to allow for a distance between the rings 1 and the core during tire production, the rings are equipped with spacers 19, shown in FIGS. 2a and 2b in connection with the rings and, individually, in FIGS. 23 and 24. As can be seen, the spacers 19 have grooves 19a for the insertion of the rings 1, which taper conically towards the middle of the tire and are positioned horizontally to the tire axis. Therefore, it is possible to push one half-breaker according to FIG. 2b from the one side and the other half-breaker from the other side onto the core.

Figure 11:
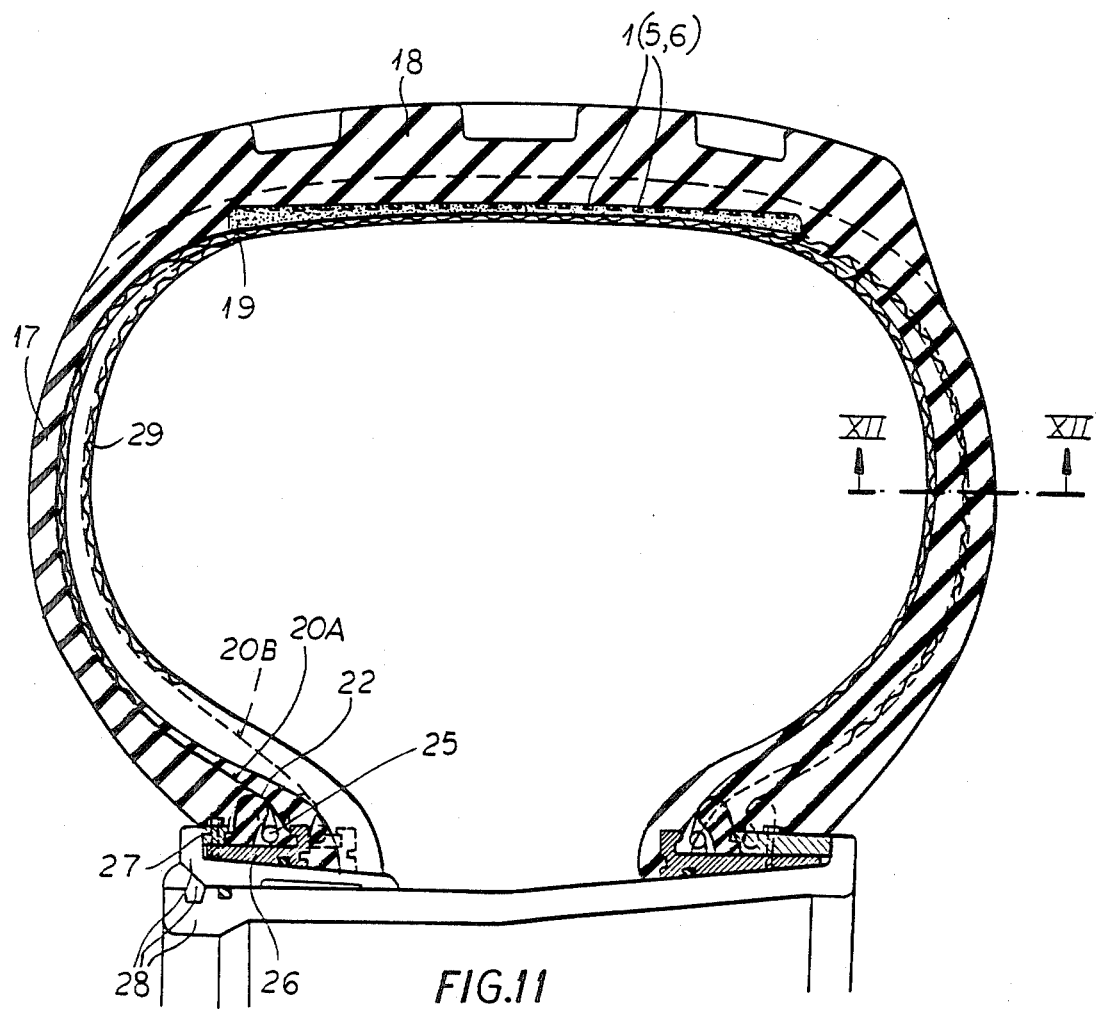
FIG. 11 is a cross-section of a complete tire with radial reinforcements offset along the tire width.

The body 17 of the tire according to FIG. 11 furthermore contains a radial reinforcement consisting of rings similar to the breaker-rings described above.

Figure 14:
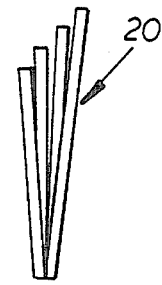
FIG. 14 is an elevational view of an end loop of the radial reinforcing element of FIG. 13 seen in the direction of arrow XIV.

Elements 20 are appropriately formed out of these rings consisting of flat wire wound in several coils. These elements 20 are open on one side and their ends are equipped with loops 21. As can be seen, especially in FIG. 14, the elements 20 are fanned out from the loops 21.

Comb-like anchoring elements, as shown especially in FIGS. 15 to 20, are provided for anchoring the elements 20.

An anchoring element 22 according to FIGS. 15 to 17 consists of a central part from which comb-like projections 23 emerge. On the bottom of the element there is a continuous groove 24 for insertion of a bolt 25, which is pushed through the loops 21 of the elements 20.

Figure 12:
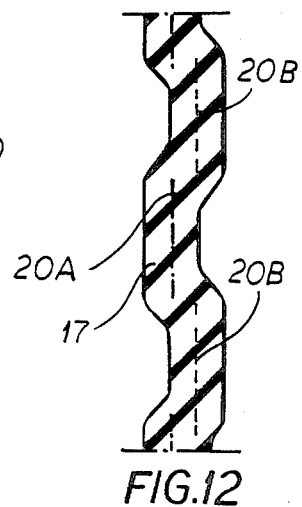
FIG. 12 is a diagrammatic cross-section of the side of the tire along line XII—XII of FIG. 11.

As FIG. 11 shows, the anchoring elements 22 rest on an anchoring ring 26 and are held in place by a positioning element 27, screwed to the ring 26. In our example, this tire is fitted on a three-part rim 28 commonly in use. Furthermore, this example features two groups 20A and 20B of the radial reinforcing elements 20. These groups are alternately offset transversely to the tire cross-section. FIG. 12 shows that the side walls of the tire are shaped in a wave-like undulating fashion along the circumference, corresponding to the individual groups. FIG. 11 furthermore features a network 29 arranged opposite the core in order to maintain the necessary distance.

The anchoring element 22a according to FIGS. 18 and 20 is distinguished from the anchoring element 22 mainly because of the fact that the distance between the comb-like projections 23 is smaller because the radial reinforcing elements 20a are narrower within the area of the loops 21.

The tire according to FIG. 21 is simpler but basically built along the same lines as the one in FIG. 11. The most important difference is that the radial reinforcing elements 20 arranged side by side are not offset.

The loops 21 of the radial reinforcing elements 20 can be held by clamps. It is, however, also possible to use solely friction, i.e., friction alone to hold the loops. Because of the fact that the end 29 of the flat wire within the loop is situated on the inside (due to the winding around the bolt 25 and the holding element 22), the friction is strong enough to prevent an opening of the loop 21.

Both the spacer 19 and the anchoring element 22 are made of an elastomer, so that they bond together perfectly with the material of the tire body or carcass 17 during the hardening of and vulcanization of the tire material and therefore guarantee high compound resistance. The tire material also fills the cavities in the loops. The production of a tire according to the invention is easier than using the kind of reinforcement employed presently because complicated winding processes are no longer necessary and the reinforcement can be fitted in a simple way.

FIGS. 25 and 30 show modifications of the radial reinforcement in which the flat wires form a figure of eight because of fittings put between them. As can be seen especially in FIGS. 27 and 28 (FIG. 28 shows a cross-section through FIG. 27 without flat wires), the fittings 30 have an elliptical cross-section in that area where the flat wires rest on the reinforcing elements 20. Because of this cross-section, the flat wires are turned in such a way that a decrease in resistance is practically impossible because of the turning of the wires.

According to FIGS. 29 and 30, the fittings 30 can also be used to build up the radial reinforcement out of individual parts 20', 20", by winding the ends of every part around a fitting 30'.

We claim:
1. A vehicle tire, comprising:
an elastomeric tire body formed with a pair of annular tire beads along inner edges of the tire, a tread extending circumferentially along an outer periphery of the tire, and the tire carcass formed with sidewalls extending between each of said beads and said tread;
radial reinforcement for said sidewalls and formed by a plurality of stretched ring reinforcement elements each in the form of a plurality of generally spirally wound superposed turns of a flat wire, said elements being spaced apart around said body and being embedded therein with loops of each element lying in said beads and said elements extending in said sidewalls and passing inwardly of said tread; and anchors in said beads passing through said loops to secure said elements, the turns of each element being fanned out away from the respective anchor toward said tread.

2. The vehicle tire defined in claim 1, further comprising at least one clamp securing the ends of the wire of each element in its stretched ring configuration.

3. The vehicle tire defined in claim 1 wherein a wire of one of said elements passes into a spiral winding of an adjacent stretched ring reinforcement element such that the spiral winding of said one of said elements begins on an internal turn thereof and proceeds to an external turn of said one of said elements and the spiral winding of said adjacent element begins on an external turn of said adjacent element and proceeds to an internal turn thereof.

4. The vehicle tire defined in claim 1 wherein said anchors each include a bolt transversing the respective loop and comblike anchor members retaining said bolts and formed with a plurality of slots each receiving a respective loop of a respective one of said elements.

5. The vehicle tire defined in claim 4 wherein said anchor members are staggered in said beads and the elements are looped in respective staggered groups around said anchor members, the anchor members and the respective groups being alternately offset with respect to one another transversely of the circumference of each bead whereby said sidewalls have a wavelike cross section corresponding to the staggering of said groups.

6. The vehicle tire defined in claim 1, further comprising respective fittings in each of said elements imparting a figure-eight configuration thereto around the tire body from bead to bead.

7. The vehicle tire defined in claim 6 wherein said fittings are generally of elliptical cross section.

* * * * *